Aug. 2, 1938.  W. T. SWINGLE ET AL  2,125,697
CENTRIFUGAL BLOWER WHEEL
Filed Sept. 14, 1937
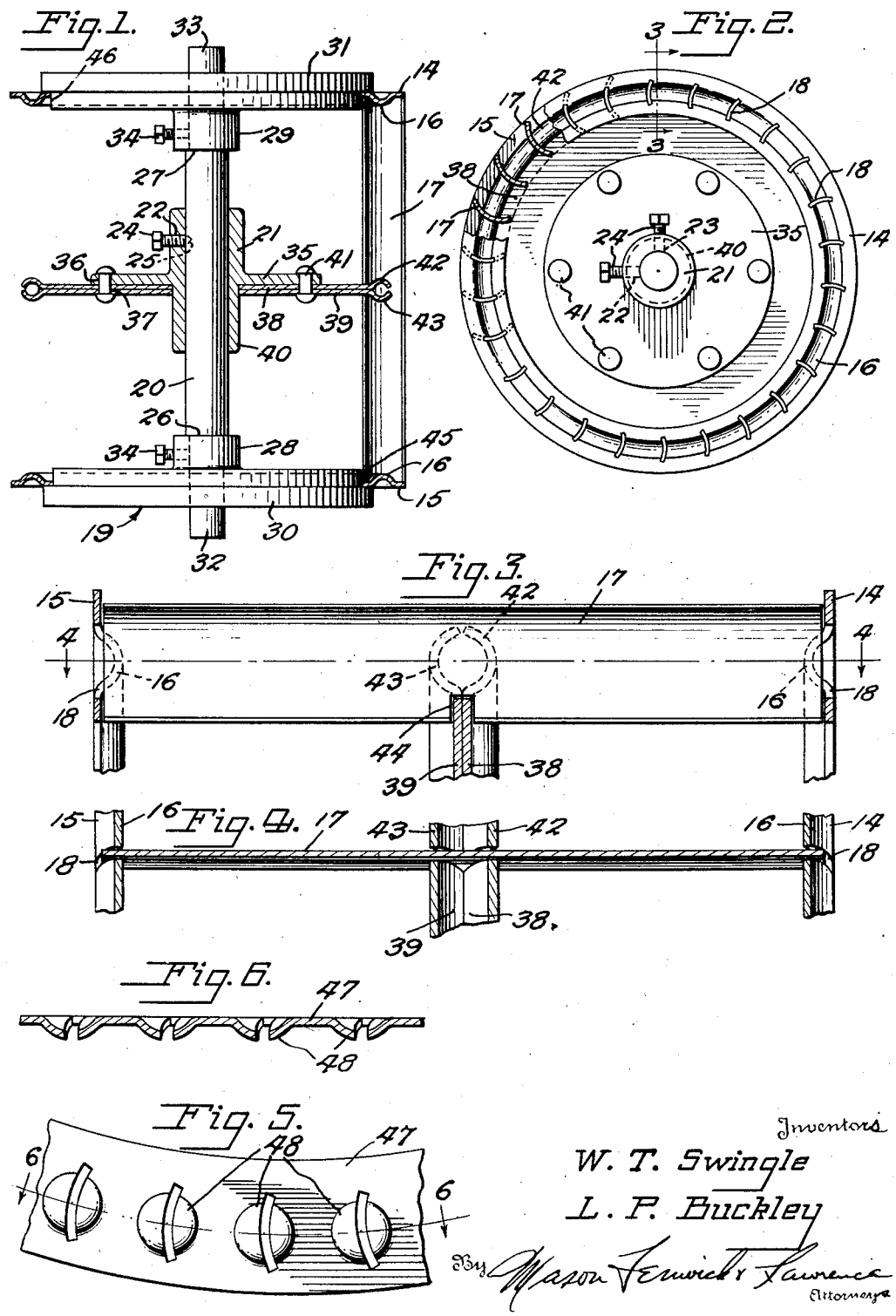
Inventors
W. T. Swingle
L. P. Buckley Patented Aug. 2, 1938

2,125,697

UNITED STATES PATENT OFFICE 2,125,697

CENTRIFUGAL BLOWER WHEEL

Wayne T. Swingle and Leo P. Buckley, Hastings, Nebr.

Application September 14, 1937, Serial No. 163,854

3 Claims. (Cl. 230—134)

This invention relates to centrifugal blower wheels and to the method of making the same.

The conventional design of blower wheel comprises a pair of flat end rings slotted to receive lugs projecting from the opposite ends of the interposed blades. These lugs projecting through the slots are then welded or riveted to the end rings to lock the blades securely to the rings. The main objection to this old method of construction resides in the difficulty of stringing the lugs of the blades through the slots in the end rings; especially, in attempting to get the last few blades in place in a 48 or 64 blade wheel, because the lugs must all be exactly aligned with the slots they are to enter.

In the present invention the difficulties referred to are overcome by eliminating the lugs on the ends of the blades and providing slots in ribs or projections formed in each end ring to receive the square ends of the blades.

The main object of the invention, therefore, is to provide a centrifugal blower wheel in which the parts thereof can be assembled very rapidly, so that the wheels can be manufactured in quantities with low cost for labor and material.

Other objects will become apparent as the detailed description thereof proceeds.

In the drawing:

Figure 1 is a sectional elevation of a jig used in assembling the elements of this blower wheel, and showing a pair of end rings and a central disc mounted on the jig in position to receive one of the blades;

Figure 2 is a top plan view of the blower wheel with parts broken away to show details of construction;

Figure 3 is a vertical section taken on the line 3—3 of Figure 2;

Figure 4 is a horizontal section taken on the line 4—4 of Figure 3;

Figure 5 is a top plan view of part of a modified form of ring;

Figure 6 is a section taken on the line 6—6 of Figure 5.

In the wheels formed in accordance with the present invention, the ends of the blades are cut off square, so that there are no projecting lugs to be aligned with correspondingly shaped slots in the end wheels. The end wheels illustrated in Figures 1, 2, 3, and 4 of the drawing, and identified by the reference numerals 14 and 15, are each provided with an inwardly projecting annular rib 16, which is slotted at regular intervals to receive the blades 17. These blade receiving slots 18 are formed only in the projecting ribs, so that the ends of the blades may be made perfectly square and be slid in between the opposed end rings 14 and 15 when the latter are properly assembled on a suitable jig such as is shown in Figure 1 of the drawing, and designated generally by the reference numeral 19.

Referring now to Figure 1, the jig 19 comprises a shaft 20 adapted to receive slidably a sleeve 21, which is provided with screwthreaded radial bores 22 and 23, adapted to receive set screws 24, having their inner ends pointed to seat in conical recesses 25 formed in the shaft 20 for properly locating the sleeve 21 thereon. The opposite ends of the shaft 20 are turned down to form shoulders 26 and 27, adapted to form stops for the inner ends of bosses 28 and 29, projecting inwardly from the circular ring positioning discs 30 and 31, respectively.

The discs 30 and 31 are centrally bored to slide on the projecting ends 32 and 33 of the shaft 20, and each of the bosses 28 and 29 has a set screw 34 extending radially therethrough to clamp the discs 30 and 31 securely in position and properly spaced apart on the shaft 20 by the shoulders 26 and 27.

The sleeve 21 is a part of the blower wheel, and is provided at its center with an annular flange 35, provided with apertures 36, adapted to register with apertures 37 formed in a pair of center discs 38 and 39, which are slidably mounted over a reduced portion 40 of the sleeve 21; and are suitably secured as by rivets 41 to the annular flange 35.

The center discs 38 and 39 are of the same diameter, which is less than the outer diameter of the end ring. The outer ends of these center discs are bent to form oppositely directed annular ribs 42 and 43 which are provided with registering slots to receive the center parts of the blades 17, each of the latter being provided with a notch 44 to straddle the ends of the discs 38 and 39 where they merge with the ribs 42 and 43. The ribs 42 and 43 are not absolutely necessary to the construction of these wheels. However, it is preferable to use these ribs because they serve in the same manner as the ribs 16 on the end rings to stiffen the blade construction as a whole.

The circular discs 30 and 31 are provided with annular recesses on the inner faces to form shoulders 45 and 46 against which the inner edges of the end ring and the blades 17 may be positioned for properly assembling the elements of the wheel. While there is only one of the blades 17 shown in Figure 1 as positioned in the jig 19 between the end rings 14 and 15, it is to be understood that these blades will be spaced around the rings 14 and 15 and the center discs 38 and 39 substantially as shown in Figure 2 of the drawing. It is not necessary that the ribs around the end rings be continuous. All that is required for properly holding the blades to the rings is some kind of inner projection on the said ring which can be slotted to receive the ends of the blades slidably when the rings are located on the jig shown in Figure 1 of the drawing.

In the modified form of the invention shown in Figures 5 and 6 of the drawing, the end rings 47 are indented at regular spaced intervals to form the projecting members 48, which are slotted to receive the blades 17. In this form of the invention, center discs similar to those shown in Figure 1 may be used; or separate projecting members similar to members 48 may be formed on the discs to receive the intermediate slotted center parts of the blades 17.

Numerous variations may doubtless be devised by persons skilled in the art without departing from the principles of our invention. We, therefore, desire no limitations to be imposed on our invention, except such as are indicated in the appended claims.

What we claim is:

1. A centrifugal blower wheel comprising a pair of end rings having annular ribs formed on one face of each ring, each of said rings being provided with slots extending only through said ribs, blades seated in said slots with their ends against the inner sides of said rings and suitably secured thereto.

2. A centrifugal blower wheel comprising a pair of end rings having annular ribs formed on one face of each ring, each of said rings being provided with slots extending only through said ribs and spaced apart angularly thereon, blades seated in said slots with their ends against the inner sides of said rings and provided on their inner edges with radially extending notches, and a pair of center discs in contact with each other and having their outer edges seated in said notches and provided with annular ribs slotted radially to extend radially and in opposite directions in bracing contact with opposite sides of each of said blades.

3. A centrifugal blower wheel including a pair of end rings each having a member projecting from one face thereof, each of said members being provided with a slot extending only to the face of the ring upon which it is formed, a blade having its opposite ends seated in said slots and against the opposing faces of said rings and suitably secured thereto.

WAYNE T. SWINGLE.
LEO P. BUCKLEY.